US007353932B2

(12) United States Patent
Aulanko et al.

(10) Patent No.: US 7,353,932 B2
(45) Date of Patent: Apr. 8, 2008

(54) TRAVELATOR, MOVING RAMP OR ESCALATOR

(75) Inventors: Esko Aulanko, Kerava (FI); Jorma Mustalahti, Hyvinkaeae (FI); Marc Ossendorf, Bochum (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/510,840

(22) Filed: Aug. 28, 2006

(65) Prior Publication Data

US 2007/0039803 A1 Feb. 22, 2007

Related U.S. Application Data

(63) Continuation of application No. PCT/FI05/00049, filed on Jan. 26, 2005.

(30) Foreign Application Priority Data

Feb. 26, 2004 (FI) ................................. 20040303

(51) Int. Cl.
*B65G 21/00* (2006.01)

(52) U.S. Cl. ...................................... 198/330; 198/321

(58) Field of Classification Search ................ 198/321, 198/330, 331
See application file for complete search history.

(56) References Cited

U.S. PATENT DOCUMENTS 3,658,166 A * 4/1972 Hara et al. .................. 198/322
5,755,315 A * 5/1998 Wallbaum et al. .......... 198/331
6,119,845 A 9/2000 Song
6,685,004 B2 * 2/2004 Fargo et al. ................ 198/330
2003/0132087 A1 7/2003 Inoue
2005/0279610 A1 * 12/2005 Ossendorf ................... 198/321

FOREIGN PATENT DOCUMENTS

DE 19856651 A1 6/1999
GB 2 299 316 A A 10/1996

OTHER PUBLICATIONS

International Search Report mailed Sep. 14, 2005.

* cited by examiner

*Primary Examiner*—James R. Bidwell
(74) *Attorney, Agent, or Firm*—Venable LLP; Robert Kinberg; Kyle D. Petaja

(57) ABSTRACT

A travelator, moving ramp or escalator comprises a conveyor having a driven end driven by a power machine and a non-driven end. At the driven end, a first drive element, in the form of an endless loop, is passed over a first driving pulley rotated by the power machine, and at the non-driven end the first drive element is passed over a first diverting pulley. A second drive element, in the form of an endless loop, is passed over a second driving pulley at the driven end rotated by the power machine, and over a second diverting pulley at the non-driven end. A first synchronizing device at the driven end provides mutual synchronization of the first and second driving pulleys. The conveyor additionally comprises a second synchronizing device arranged at the non-driven end for mutual synchronization of the first and second diverting pulleys.

11 Claims, 2 Drawing Sheets

TRAVELATOR, MOVING RAMP OR ESCALATOR

CROSS-REFERENCE TO RELATED APPLICATIONS

This application is a continuation of International Application No. PCT/FI2005/00049, filed Jan. 26, 2005, designating the United States and claiming priority from Application FI20040303 filed in Finland on Feb. 26, 2004. The disclosures of both foregoing applications is incorporated herein by reference.

BACKGROUND OF THE INVENTION

The present invention relates to a travelator, moving ramp or escalator. In prior art, a travelator, moving ramp or escalator is known which comprises a power means and a conveyor having an end driven by the power means and a non-driven end. The conveyor comprises a first drive element and a second drive element, which are disposed at a distance from each other and parallel to each other, each being implemented as an endless loop. The drive elements are usually link chains or toothed belts.

A number of conveyor platforms, such as pallets, are arranged one after the other and secured to the first and the second drive elements. At the driven end of the conveyor, the first drive element is passed over a first driving pulley rotated by the power means and at the non-driven end over a first diverting pulley. The second drive element is passed at the driven end of the conveyor over a second driving pulley rotated by the power means and over a second diverting pulley at the non-driven end. Arranged at the driven end are synchronizing means for mutual synchronization of the first driving pulley and the second driving pulley.

The elongations of the drive elements at the non-driven end of the conveyor may be different.

In conventional prior-art travelators, moving ramps and escalators, the transport length of the conveyor is reasonably short and the link chains usually employed as drive elements are of a very heavy design. For example, the effective diameter of the driving pulley may be on the order of 60 cm and the chain pitch 130-150 mm. The difference of elongation of the link chains on opposite sides does not become very large and no problem arises.

Today, however, there is a need for travelators, moving ramps and/or escalators in which the transport distances are very long and in which the distance between the driving and diverting pulleys of the drive elements are consequently also very long. For example, in very long travelators, the distance between the driving and diverting pulleys is long, e.g. on the order of 100 meters.

Further, there has arisen a need for travelators, moving ramps and escalators of low-construction height designed to be mounted directly on a fixed base, such as a floor, without any special pits formed in the fixed structure, such as the floor of a building, for embedded mounting of the frame and machinery of the travelator. In the frame structure of a travelator, moving ramp or escalator mounted on a fixed base there is very little space for the drive machine of the conveyor, and therefore the diameter of the driving and diverting pulleys can not be very large and correspondingly the drive elements used, such as link chains or belts, are also quite thin, so their elongations and accordingly the difference of elongation may become large enough to cause problems. For example, if the drive elements used in a 100 m long conveyor are link chains with a pitch of ⅝", then the elongation of the link chain may be as much as about 30 cm. The difference of elongation of the link chains used as first and second drive elements may be e.g. about 10 cm. The difference of elongation becomes the more pronounced the longer and thinner the chains are.

The difference of elongation may be due to different tolerances of the chains and/or different wear resulting from uneven loading of the conveyor. Uneven loading again may be due to the fact that passengers usually stand on the right-hand side of the conveyor. Therefore, the drive element on the right-hand side undergoes greater elongation than does the drive element on the left-hand side.

In prior art, as the diverting pulleys at the non-driven end of the conveyor are in no way synchronized with each other and because the transport platforms are fastened to both drive elements, the difference of elongation accumulating at the non-driven end of the conveyor leads to a problematic situation where the transport platforms especially near the non-driven end of the conveyor tend to move in a position differing from the mutually parallel position at the driven end, that is to say, in an oblique position relative to the transport direction, which may result in the transport platforms being stuck on their guide rails, thus stopping the conveyor.

SUMMARY OF THE INVENTION

It is an object of the present invention to overcome the above-mentioned drawbacks.

Another object of the invention is to provide a travelator, moving ramp or escalator in which it is possible to use longer and thinner, inexpensive drive elements requiring a lower tolerance accuracy than before.

A further object of the invention is to provide a travelator, moving ramp or escalator in which unequal wear of the drive elements causes less problems than before.

A further object of the invention is to provide a travelator, moving ramp or escalator in which the load is better distributed between the drive elements.

Yet another object of the invention is to provide a travelator, moving ramp or escalator in which the transport platforms are prevented from getting into an oblique position relative to the transport direction at the non-driven end of the conveyor.

The above and other objects are accomplished by the invention wherein there is provided, according to one exemplary embodiment, a travelator, moving ramp or escalator, comprising: a power machine; a conveyor having a driven end driven by the power machine, and a non-driven end, the conveyor comprising: a first drive element and a second drive element at a distance from and parallel to the first drive element, each drive element comprising an endless loop; a plurality of transport platforms arranged one after the other and secured to the first and second drive elements; a first driving pulley disposed at the driven end and over which the first drive element is passed, the first driving pulley being arranged to be rotated by the power machine; a first diverting pulley disposed at the non-driven end and over which the first drive element is passed; a second driving pulley disposed at the driven end and over which the second drive element is passed, the second driving pulley being arranged to be rotated by the power machine; a second diverting pulley disposed at the non-driven end and over which the second drive element is passed; a first synchronizing device arranged at the driven end for mutual synchronization of the first driving pulley and the second driving pulley; and a second synchronizing device arranged at the non-driven end for mutual synchronization of the first diverting pulley and the second diverting pulley.

The invention has the advantage that the second synchronizing device equalizes the error arising from unequal elongation of the drive elements or from other errors between the two drive elements so that the load is evenly distributed on both. This makes it possible to use thinner and more stretchable drive elements than before, which can be manufactured to less strict tolerances than before. Furthermore, the invention makes it possible to produce a longer travelator, moving ramp or escalator designed to be mounted on a fixed base than before.

In another exemplary embodiment of the invention, the first synchronizing device at the driven end comprise a first synchronizing shaft connected to the power machine for rotation; a third driving pulley mounted on the first synchronizing shaft; a third diverting pulley mounted on the same shaft with the first driving pulley; a third drive element comprising an endless loop passed over the third driving pulley and the third diverting pulley; a fourth driving pulley mounted on the first synchronizing shaft at a distance from the third driving pulley; a fourth diverting pulley mounted on the same shaft with the second driving pulley; and a fourth drive element comprising an endless loop passed over the fourth driving pulley and the fourth diverting pulley.

In a further exemplary embodiment of the invention, the synchronizing device at the non-driven end comprises: a second synchronizing shaft; a fifth diverting pulley mounted on the second synchronizing shaft; a sixth diverting pulley mounted on the same shaft with the first diverting pulley; a fifth drive element comprising an endless loop and passed over the fifth diverting pulley and the sixth diverting pulley; a seventh diverting pulley mounted on the second synchronizing shaft at a distance from the fifth diverting pulley; an eighth diverting pulley mounted on the same shaft with the second diverting pulley; and a sixth drive element comprising an endless loop over and passed over the seventh diverting pulley and, the first synchronizing shaft is outside the track of motion of the transport the eighth diverting pulley.

BRIEF DESCRIPTION OF THE DRAWINGS

In the following, the invention will be described in detail with reference to embodiment examples and the attached drawings, wherein.

DETAILED DESCRIPTION OF THE INVENTION

Figure 1:
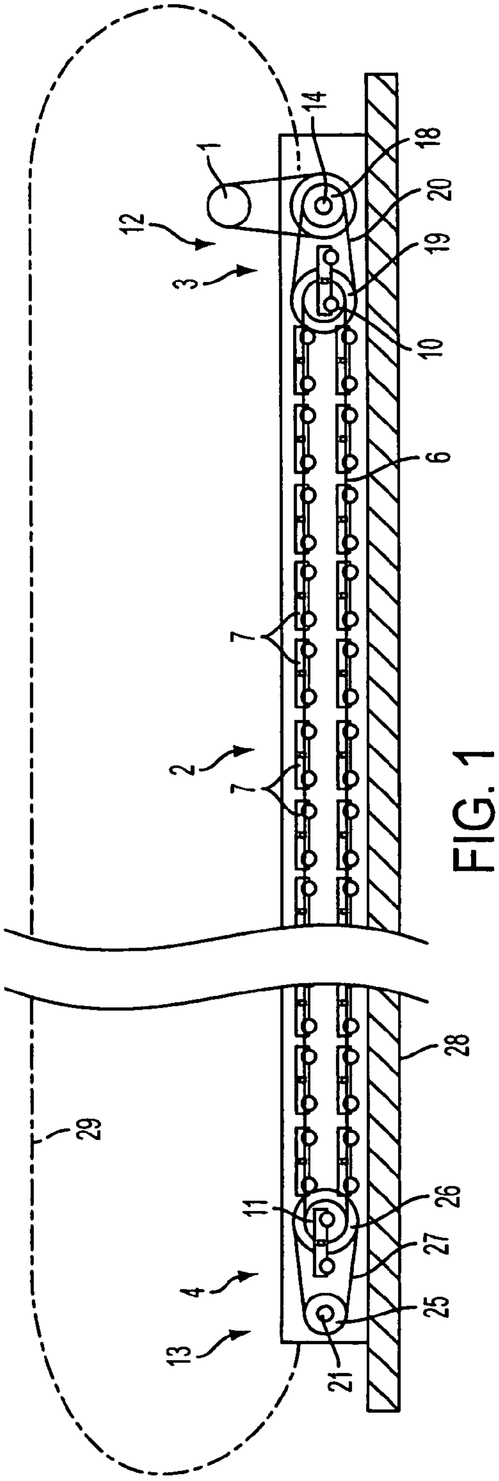
FIG. 1 presents a longitudinal sectional view along the section line shown in FIG. 2 of an exemplary embodiment of a drive arrangement of the conveyor of the travelator, moving ramp or escalator of the invention.
Figure 2:
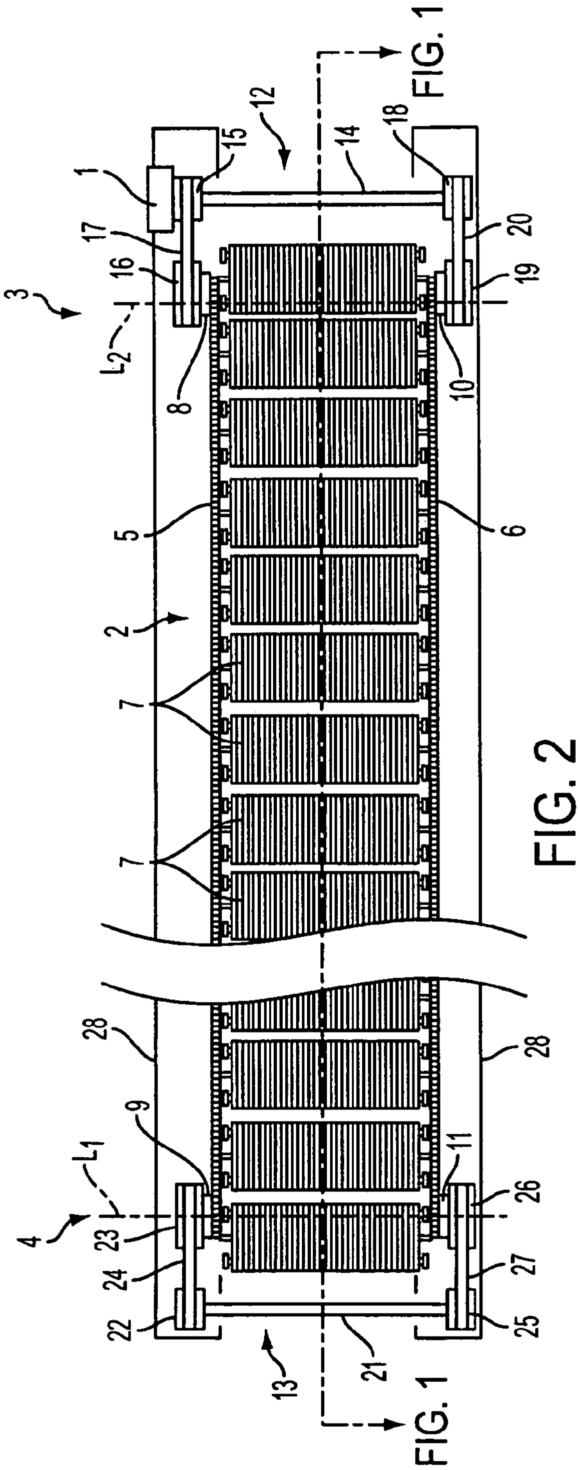
FIG. 2 presents a top view of the drive arrangement shown in FIG. 1.

FIGS. 1 and 2 illustrate a horizontal travelator having a low-construction height mounted on a fixed base, such as a floor or other support, which means that no pit needs to be made in the fixed base for the travelator machinery. A travelator having a low construction height is described, for example, in co-owned U.S. application Ser. No. 11/491,495, filed Jul. 24, 2006, the disclosure of which is incorporated herein by reference. In the following description of an example, the invention is described in connection with a travelator, but it is obvious that corresponding principles of the invention can be applied to moving ramps and escalators as well.

The illustrated travelator comprises a conveyor 2, which in this case is a pallet conveyor. The conveyor 2 is mounted on a conveyor frame 28. The conveyor frame 28 lies on a floor base throughout its length. Secured to the conveyor frame 28 are usually two balustrades 29 extending alongside the conveyor 2 throughout its length on either side of it.

In this description, that end of the conveyor 2 which in FIGS. 1 and 2 is the right-hand end and by which the conveyor is driven by a power machine 1, is referred to as the driven end 3. The other end of the conveyor 2, which is not provided with a power machine, is referred to as the non-driven end 4.

The conveyor 2 comprises a first drive element 5 and second drive element 6, which are at a distance from each other and parallel to each other, each being formed as an endless loop. A number of transport platforms 7, which in the example are pallets, have been arranged one after the other. Each transport platform 7 is fastened from one side oriented in the transport direction to the first drive element 5 and from the other side oriented in the transport direction to the second drive element 6. The first and the second drive elements 5 and 6 may be link chains or alternatively toothed belts.

Placed on one side of the conveyor 2 at the driven end 3 of the conveyor 2 is a first driving pulley 8 rotated by the power machine 1, and a first diverting pulley 9 is provided at the non-driven end. The first drive element 5 is passed over the first driving pulley 8 and the first diverting pulley 9.

Correspondingly, on the other side of the conveyor 2 at the driven end 3 of the conveyor 2 is a second driving pulley 10 rotated by the power machine 1, and a second diverting pulley 11 is provided at the non-driven end. The second drive element 6 is passed over the second driving pulley 10 and the second diverting pulley 11.

At the driven end 3, the first driving pulley 8 and the second driving pulley 10 are mutually synchronized by a first synchronizing device 12. The first synchronizing device 12 comprises, as an essential functional part, a first synchronizing shaft 14, to which the power machine 1 is connected to rotate it. Mounted on the first synchronizing shaft 14 is a third driving pulley 15. A third diverting pulley 16 is mounted on the same shaft with the first driving pulley 8. A third drive element 17 is passed as an endless loop over the third driving pulley 15 and the third diverting pulley 16. A fourth driving pulley 18 is mounted on the first synchronizing shaft 14 at a distance from the third driving pulley 15. A fourth diverting pulley 19 is mounted on the same shaft with the second driving pulley 10. A fourth drive element 20 is passed as an endless loop over the fourth driving pulley 18 and the fourth diverting pulley 19. Thus, the driving power is transmitted to both drive elements 5 and 6 via the same synchronizing shaft 14.

A similar synchronization arrangement is also provided at the non-driven end 4 of the conveyor 2, where the conveyor 2 comprises a second synchronizing device 13 for mutual synchronization of the first diverting pulley 9 and the second diverting pulley 11. The second synchronizing device 13 at the non-driven end 4 comprise as an essential functional part a second synchronizing shaft 21. A fifth diverting pulley 22 is mounted on the second synchronizing shaft 21. A sixth diverting pulley 23 is mounted on the same shaft with the first diverting pulley 9. A fifth drive element 24 is passed as an endless loop over the fifth diverting pulley 22 and the sixth diverting pulley 23. A seventh diverting pulley 25 is mounted on the second synchronizing shaft 21 at a distance from the fifth diverting pulley 22. An eighth diverting pulley 26 is mounted on the same shaft with the second diverting pulley 10. A sixth drive element 27 is passed as an endless loop over the seventh diverting pulley 25 and the eighth diverting pulley 26. Thus, at the non-driven end 4 the load is equalized between the two drive elements 5 and 6 via the second synchronizing shaft 21.

As can be seen from FIGS. 1 and 2, the conveyor 2 is a pallet conveyor of a flat shape. The pallets move from the non-driven end 4 of the conveyor 2 to its driven end 3, and vice versa, along an upper transport track consisting of upper supporting guide rails provided in the conveyor frame 28. At the driven end 3 of the conveyor, maintaining their position and orientation, the pallets move onto a lower return track consisting of lower supporting guide rails provided in the conveyor frame, where the pallets 7 return in the opposite direction relative to the transport direction of the conveyor to the no-driven end 4 of the conveyor.

From FIG. 2 shows that the axes of rotation of the first and second diverting pulleys 9 and 11 are coincident, that is the axis of rotation of the first diverting pulley 9 is on the same axis line $L_1$ with the axis of rotation of the second diverting pulley 11. The second synchronizing shaft 21 is at a distance from the first axis line $L_1$ outside the track of motion of the transport platforms 7. Similarly, at the other end of the conveyor 2, the axes of rotation of the first and second driving pulleys 8 and 10 are coincident, that is the axis of rotation of the first driving pulley 8 is on the same axis line $L_2$ with the axis of rotation of the second driving pulley 10. Further, the first synchronizing shaft 14 is at a distance from the second axis line $L_2$ outside the track of motion of the transport platforms 7. This arrangement permits the pallets 7 to move at the driven and non-driven ends 3 and 4 of the conveyor from the lower return track to the upper transport track and vice versa past the synchronizing shafts 14 and 21.

Figure 3:
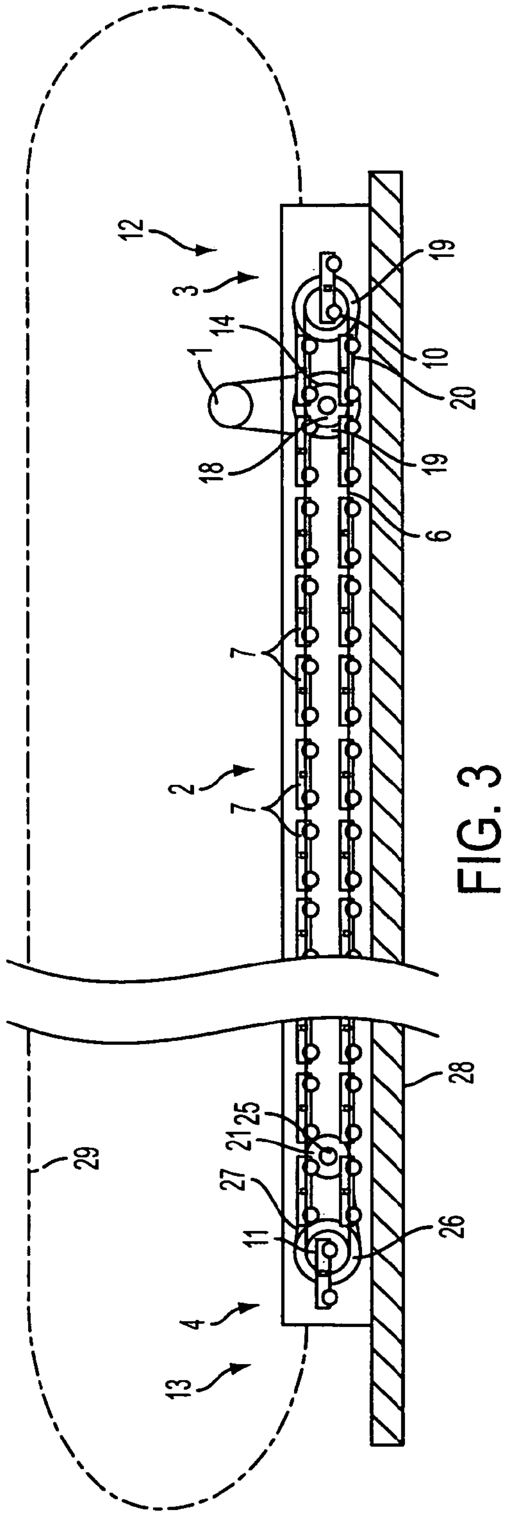
FIG. 3 presents a longitudinal sectional view along the section line shown in FIG. 4 of another exemplary embodiment of a drive arrangement of the conveyor of the travelator, moving ramp or escalator of the invention.
Figure 4:
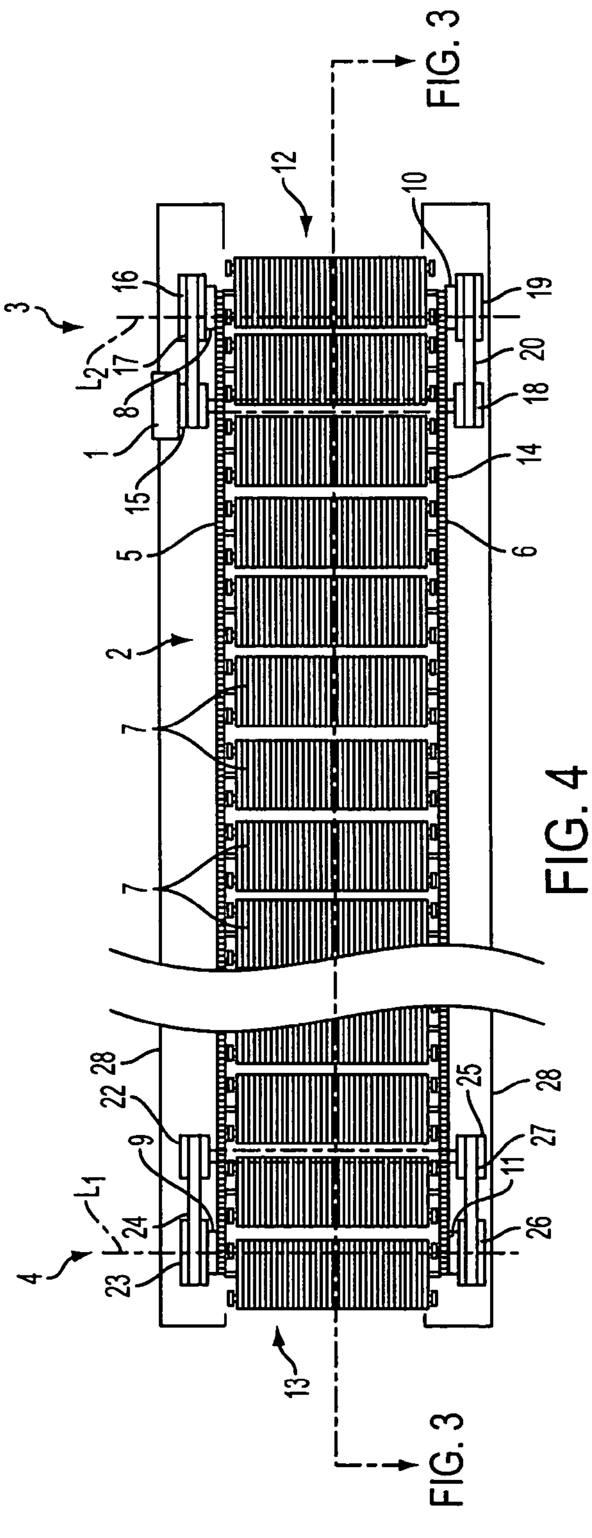
FIG. 4 presents a top view of the drive arrangement shown in FIG. 3.

Alternative exemplary embodiments are conceivable in which the first synchronizing shaft 14 and/or the second synchronizing shaft 21 are (is) arranged between the upper transport track and the lower return track, but inside the track of motion of the transport platforms. Such an arrangement allows the length of the structure to be reduced. FIGS. 3 and 4 show the exemplary arrangement in which both the first and second synchronizing shafts 14 and 18 are located within the track of motion of the transport platforms. The arrangement in FIGS. 3 and 4 is therefore similar to that depicted in FIGS. 1 and 2, except that the driven pulleys 15, 18, power machine 1 and driving elements 17, 20, are thus flipped together with shaft 14, 1800 about axis line $L_2$ so that the shaft 14 is located inside the track of motion of the transport platforms, between the upper transport portion and the lower return portion. The same is true of shaft 21 and associated pulleys 22 and 25 which are flipped 1800 about axis line $L_1$ so that shaft 21 is located inside the track of motion of the platforms, between the upper transport portion and the lower return portion. As can be seen, the overall length of the depicted travelator is shortened.

The invention is not limited to the exemplary embodiments described above. Instead, many variations are possible within the scope of the inventive concept defined in the claims.

What is claimed is:

1. A travelator, moving ramp or escalator, comprising: a power machine;

- a conveyor having a driven end driven by the power machine, and a non-driven end, the conveyor comprising:
- a first drive element and a second drive element at a distance from and parallel to the first drive element, each drive element comprising an endless loop;
- a plurality of transport platforms arranged one after the other and secured to the first and second drive elements;
- a first driving pulley disposed at the driven end and over which the first drive element is passed, the first driving pulley being arranged to be rotated by the power machine;
- a first diverting pulley disposed at the non-driven end and over which the first drive element is passed;
- a second driving pulley disposed at the driven end and over which the second drive element is passed, the second driving pulley being arranged to be rotated by the power machine;
- a second diverting pulley disposed at the non-driven end and over which the second drive element is passed;
- a first synchronizing device arranged at the driven end for mutual synchronization of the first driving pulley and the second driving pulley;
- a second synchronizing device arranged at the non-driven end for mutual synchronization of the first diverting pulley and the second diverting pulley; and
- wherein the first synchronizing device at the driven end comprises:
  - a first synchronizing shaft connected to the power machine for rotation;
  - a third driving pulley mounted on the first synchronizing shaft;
  - a third diverting pulley mounted on the same shaft with the first driving pulley;
  - a third drive element comprising an endless loop passed over the third driving pulley and the third diverting pulley;
  - a fourth driving pulley mounted on the first synchronizing shaft at a distance from the third driving pulley;
  - a fourth diverting pulley mounted on the same shaft with the second driving pulley; and
  - a fourth drive element comprising an endless loop passed over the fourth driving pulley and the fourth diverting pulley.

2. A travelator, moving ramp or escalator as defined in claim 1 wherein the second synchronizing device at the non-driven end comprises:

- a second synchronizing shaft;
- a fifth diverting pulley mounted on the second synchronizing shaft;
- a sixth diverting pulley mounted on the same shaft with the first diverting pulley;
- a fifth drive element comprising an endless loop and passed over the fifth diverting pulley and the sixth diverting pulley;
- a seventh diverting pulley mounted on the second synchronizing shaft at a distance from the fifth diverting pulley;
- an eighth diverting pulley mounted on the same shaft with the second diverting pulley; and a sixth drive element comprising an endless loop over and passed over the seventh diverting pulley and the eighth diverting pulley.

3. A travelator, moving ramp or escalator according to claim 2, wherein the first and second diverting pulleys have coincident axes of rotation and the second synchronizing shaft is at a distance from the coincident axes of rotation of the first and second diverting pulleys.

4. A travelator, moving ramp or escalator according to claim 3, wherein the transport platforms have a track of motion and the second synchronizing shaft is outside the track of motion of the transport platforms.

5. A travelator, moving ramp or escalator according to claim 3, wherein the transport platforms have a track of motion which includes an upper transport portion and a lower return portion; and the second synchronizing shaft is inside the track of motion of the transport platforms, arranged between the upper transport portion and the lower return portion.

6. A travelator, moving ramp or escalator according to claim 2, wherein the first and second driving pulleys have coincident axes of rotation and the first synchronizing shaft is at a distance from the coincident axes of rotation of the first and second driving pulleys.

7. A travelator, moving ramp or escalator according to claim 6, wherein the transport platforms have a track of motion and the first synchronizing shaft is outside the track of motion of the transport platforms.

8. A travelator, moving ramp or escalator according to claim 6, wherein the transport platforms have a track of motion which includes an upper transport portion and a lower return portion; and the first synchronizing shaft is inside the track of motion of the transport platforms, arranged between the upper transport portion and the lower return portion.

9. A travelator, moving ramp or escalator according to claim 1, wherein the first drive element and the second drive element comprise link chains.

10. A travelator, moving ramp or escalator according to claim 1, wherein the first drive element and the second drive element comprise toothed belts.

11. A travelator, moving ramp or escalator according to claim 1, wherein the travelator, moving ramp or escalator has a low construction height mounted on a fixed base including one of a floor or other support.

* * * * *